US007051001B1

(12) United States Patent
Slater

(10) Patent No.: US 7,051,001 B1
(45) Date of Patent: May 23, 2006

(54) SYSTEM AND METHOD FOR MERCHANT FUNCTION ASSUMPTION OF INTERNET CHECKING AND SAVINGS ACCOUNT TRANSACTIONS

(75) Inventor: Alan Slater, East Brunswick, NJ (US)

(73) Assignee: Citibank, N.A., New York, NY (US)

( * ) Notice: Subject to any disclaimer, the term of this patent is extended or adjusted under 35 U.S.C. 154(b) by 534 days.

(21) Appl. No.: 09/384,678

(22) Filed: Aug. 27, 1999

Related U.S. Application Data

(63) Continuation-in-part of application No. 09/237,739, filed on Jan. 26, 1999, now Pat. No. 6,098,053.

(60) Provisional application No. 60/098,196, filed on Aug. 27, 1998.

(51) Int. Cl.
*G06F 17/60* (2006.01)
(52) U.S. Cl. .......................................... 705/39; 705/26
(58) Field of Classification Search ................ 705/39, 705/26
See application file for complete search history.

(56) References Cited

U.S. PATENT DOCUMENTS

| 5,036,461 A | * | 7/1991 | Elliott et al. ................ 364/408 |
| 5,455,407 A | * | 10/1995 | Rosen ......................... 235/380 |
| 5,883,810 A | | 3/1999 | Franklin et al. ....... 364/479.02 |
| 5,933,816 A | | 8/1999 | Zeanah et al. ................ 705/35 |
| 5,953,422 A | | 9/1999 | Angelo et al. ................ 380/23 |

FOREIGN PATENT DOCUMENTS

CA            2153727     *  2/1996

OTHER PUBLICATIONS

Lalemi et al., Financial EDI ar Motorola: A Case Study in Trading Partner Enrollment, Journal of Cash management, v12n3, pp.: 47-51, May/Jun. 1992.*

* cited by examiner

*Primary Examiner*—Michael Cuff
(74) *Attorney, Agent, or Firm*—George T. Marcou; Kilpatrick Stockton LLP

(57) ABSTRACT

A system and method for merchant function assumption of Internet checking and savings account transactions enables a service provider to take over all merchant type transactions and provide a merchant, such as an Internet merchant, with an approved order and appropriate credit for the transaction. A service provider server receives an electronic check or a payment instruction for the merchant from a customer. The payment instruction includes, for example, the originator's digital certificate and payment and purchase information, including the originator's checking or savings account number. The payment instruction is automatically sent to a customer's bank's server, which confirms the availability of funds for the payment. A confirmation of the availability of funds is automatically sent to the merchant, and a credit for the payment is automatically sent to the merchant's account. In addition, the service provider can consolidate order and settlement transactions, which saves transaction costs for the merchant.

11 Claims, 8 Drawing Sheets

SYSTEM AND METHOD FOR MERCHANT FUNCTION ASSUMPTION OF INTERNET CHECKING AND SAVINGS ACCOUNT TRANSACTIONS

CROSS REFERENCE TO RELATED APPLICATIONS

This application claims the priority of applicant's co-pending application having U.S. Ser. No. 60/098,196 Aug. 27, 1998, incorporated herein by this reference, and this application is a continuation-in-part of applicant's co-pending utility application having U.S. Ser. No. 09/237,739 filed Jan. 26, 1999, now U.S. Pat. No. 6,098,053 incorporated herein by this reference. This application also relates to applicant's co-pending utility application 60/097,501 entitled "System and Use for Correspondent Banking" filed Aug. 27, 1999, incorporated herein by this reference.

FIELD OF THE INVENTION

The present invention relates generally to the field of banking systems and Internet transactions, and more particularly, to a system that allows a service provider to perform merchant functions in utilizing checking and savings accounts in Internet transactions.

BACKGROUND OF THE INVENTION

With the increasing commercialization of the Internet, methods of performing payment transactions are becoming well known and new payment methods are desired. In an effort to expand the available sources of payment, methods have been developed to utilize checking and savings account funds to perform Internet transactions. Some methods allow the use of "electronic checks" to perform transactions.

There are a number of problems, however, associated with current electronic check methods. For example, since the flow of the current electronic checks replicates the flow used for paper checks, the merchant is unsure if the electronic check will be paid and therefore delays shipment of the goods to the customer for many days. To the customer, despite the transaction having the appearance of being on-line, it takes several days for his account to be charged. Another scheme requires the customer to deposit funds into a trusted third party's account before the customer can perform a transaction. Lastly, schema which can give on-line approvals are under development.

For a customer to be able to use the currently available electronic checks, the customer must be a member of a bank or financial institution that offers this service. Over the next 5 to 10 years, however, only a handful of financial institutions are estimated to participate in issuing electronic checks or the more efficient "electronic payment instructions." Because of this limited participation, the majority of customers will not have access to electronic checks or electronic payment instructions. Thus, the number of purchasers that a merchant can attract and serve with an electronic check or an electronic payment instruction option is limited.

Additionally, for example, not only must the customer be a member of a participating financial institution, but the merchant must also set up procedures for these types of transactions to deal with the limited number of participating financial institutions. Due to the limited number of customers who would utilize this payment method, a merchant may be discouraged from expending the time and money to establish such a system.

Further, these new Internet checking and savings account transaction options present the merchant with a whole new set of responsibilities. Not only must the merchant establish new procedures to monitor and fulfill these orders, they must also keep track of verifications and credits. Many merchants do not want to deal with these issues or cannot afford to hire and train personnel who are able to handle and monitor these new functions.

Therefore, a solution to these problems is needed to improve the utilization and acceptance of Internet transactions using checking and savings accounts by merchants.

SUMMARY OF THE INVENTION

It is a feature and advantage of the present invention to provide a system and method for merchant function assumption of Internet checking and savings account transactions which enables a service provider to take over certain merchant type functions and to provide the merchant with an approved order and appropriate credit for the transaction.

It is a further feature and advantage of the present invention to provide a system and method for merchant function assumption of Internet checking and savings account transactions which enables a service provider to consolidate order and settlement transactions for a merchant that enables the merchant to save the transaction costs for the merchant.

To achieve the stated and other features, advantages and objects, an embodiment of the present invention provides a system and method for merchant function assumption of Internet checking and savings account transactions which enables a service provider to take over certain merchant type functions and to provide the merchant with an approved order and appropriate credit for the transaction. Further, an embodiment of the present invention enables a service provider to consolidate order and settlement transactions for a merchant that saves transaction costs for the merchant.

In an embodiment of the present invention, a service provider receives an order from a customer that is sent to a merchant. The service provider can be a financial institution, such as a service providing bank (hereinafter referred to as "service provider"). The order comprises, for example, the customer's digital certificate and purchase and payment information, including the customer's checking or savings account number. The service provider opens the order and verifies the digital certificate and payment information. The service provider sends a message to the bank indicated by the customer's payment instruction to verify and debit the customer's account if the amount of the transaction does not exceed the account balance.

In an embodiment of the present invention, the customer's bank sends a message back to the service provider verifying or denying the debited amount. Depending on the customer's bank's message, the service provider then sends a message to the merchant to fill or deny the order. Further, the service provider insures that the merchant's bank receives an Automated Clearing Hours (ACH) credit if the order is approved. Finally, the service provider may send a message back to the customer that confirms, denies, or requests more information regarding the order.

Additionally, in an embodiment of the present invention, the service provider may consolidate order and settlement transactions. For example, rather than receiving individual payments, the service provider insures that the merchant receives one consolidated ACH payment covering all orders over a certain time period. The service provider may then give the merchant a check list or automated files for cross-checking payments with orders.

In another variation in the process flow for an embodiment of the present invention, for example, the service provider can first receive the ACH credit before forwarding it to the merchant's bank. Similarly, the service provider may directly receive the customer order before it ever gets to the merchant. The present disclosure is intended to cover all such variations and modifications of the present invention.

In particular, an embodiment of the present invention makes use of computer hardware and software, such as a customer's processor or PC with modem for communicating, for example, with a merchant's on-line terminal or a service provider's server over the Internet. The service provider's server may also run an Internet website for the merchant. Further, the service provider's server communicates over the Internet, for example, with one or more of the merchant's on-line terminal, the merchant's financial institution server, and the customer's financial institution server. The service provider's server assumes at least one merchant function in a financial transaction, such as an Internet website transaction, between the merchant and the customer. For example, the service provider's server receives information about the financial transaction for the merchant, automatically identifies the intended recipient of the information, and automatically sends the information to the intended recipient for the merchant.

In an electronic check aspect for an embodiment of the present invention, the customer at the customer's processor makes a purchase on the merchant's Internet website hosted, for example, by the service provider's server and uses software on the customer's processor to prepare and send an electronic check for the purchase price over the Internet to the service provider's server for the merchant. The service provider's server receives the electronic check for the merchant and automatically reformats the electronic check to a format which can be understood at the merchant's on-line terminal. The service provider's server automatically endorses the electronic check for the merchant, automatically prepares a deposit for presentation of the endorsed check to the merchant's bank's server, and automatically sends the deposit and endorsed electronic check over the Internet to the merchant's bank's server. The merchant's bank's server receives the endorsed electronic check, automatically creates an ACH debit to the customer's bank's server for the customer's account, automatically posts the credit to the merchant's account, and automatically makes the details of the credit known to the merchant.

In a Z-flow model aspect for an embodiment of the present invention, the customer at the customer's processor makes a purchase on the merchant's Internet website hosted, for example, by the service provider's server and uses software on the customer's processor to prepare and send a payment instruction via e-mail or HTML page for the purchase price over the Internet to the service provider's server for the merchant. The service provider's server receives the payment instruction for the merchant and automatically sends the payment instruction with a request for payment over the Internet to the customer's bank's server. The customer's bank's server receives the payment instruction and request for payment and automatically confirms that sufficient funds are available for the payment instrument in the customer's account, automatically sends an approval of the payment instruction to the service provider's server for the merchant over the Internet, and automatically sends an ACH credit for the payment according to the payment instruction to the merchant's bank for the merchant's account.

In this aspect of an embodiment of the present invention, the service provider's server receives and automatically reformats the approval of the payment instruction to a format which can be read at the merchant's on-line terminal and sends the reformatted approval of the payment instruction over the Internet to the merchant's on-line terminal. Upon receipt of the reformatted approval of the payment instruction, the merchant ships the goods. When the merchant's bank's server receives the ACH credit, it automatically posts the credit to the merchant's account and automatically makes the details of the credit known to the merchant.

In another Z-flow model aspect for an embodiment of the present invention, the service provider's server receives credits for the merchant for various customers from the customers' banks' servers. Rather than generating an ACH credit to the merchant's bank's server for the merchant's account each time a credit is received, the service provider's server accumulates these credits for the merchant over a period of time. Periodically, the service provider's server generates a single ACH credit or wire transfer for the accumulated or consolidated credits at one time to the merchant's bank's server for the merchant's account in order to save transaction costs to the merchant.

Additional objects, advantages and novel features of the invention will be set forth in part in the description which follows, and in part will become more apparent to those skilled in the art upon examination of the following, or may be learned by practice of the invention.

DETAILED DESCRIPTION

Figure 1:
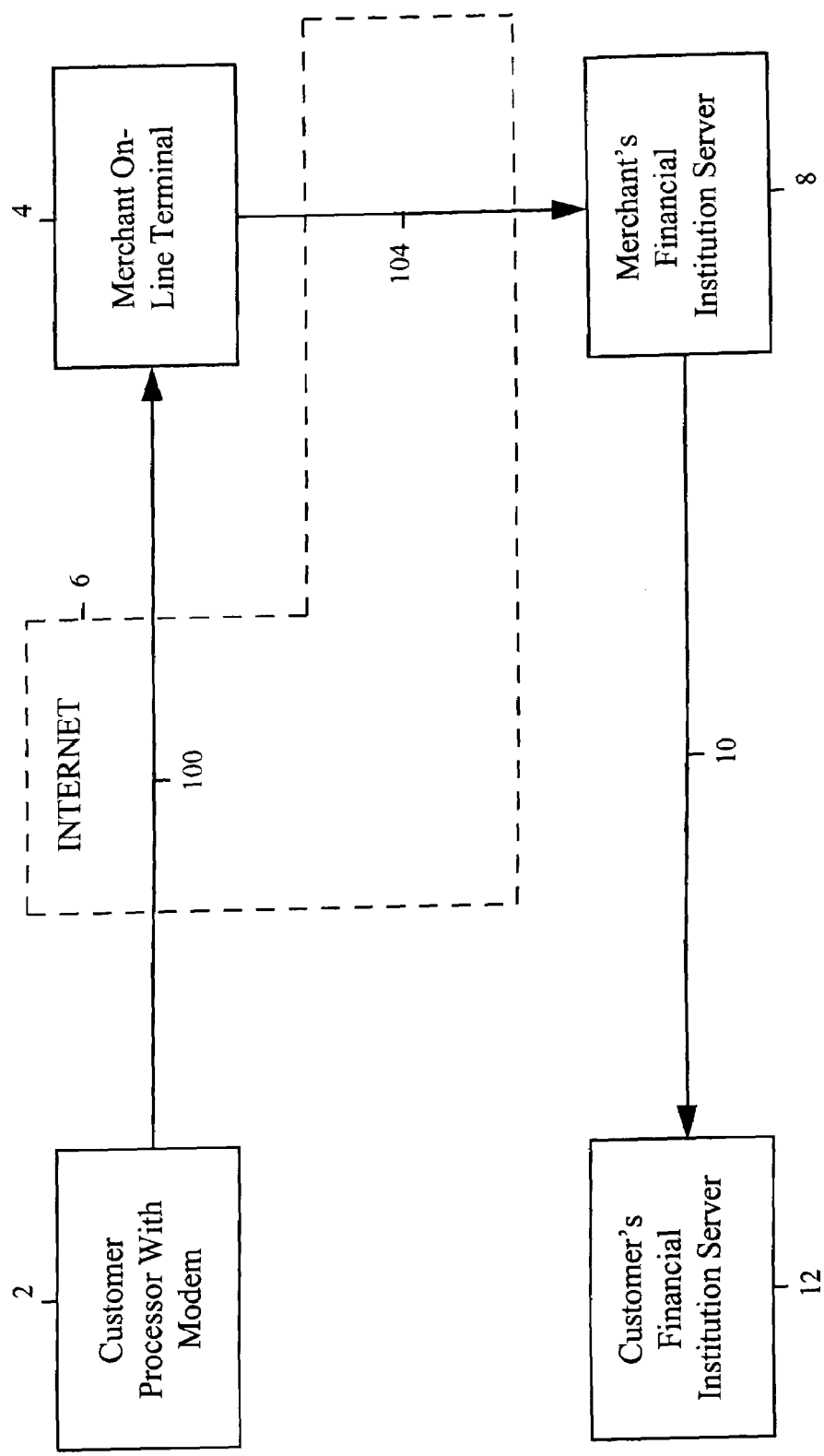
FIG. 1 is a schematic diagram which illustrates an example overview of key components and the flow of information between the key components for a prior art electronic check or e-check model for an Internet transaction.

FIG. 1 is a schematic diagram which illustrates an example of key components and the flow of information between the key components for a prior art electronic check or e-check model for an Internet transaction. Referring to FIG. 1, the e-check model is designed basically like a traditional paper check but using computer hardware and software, for example, by a customer at the customer's personal computer (PC) or processor with modem 2 for issuing the e-check and sending the e-check 100 to the merchant's on-line terminal 4 over the Internet 6. The e-check model also involves use of computer hardware and software at the merchant's on-line terminal 4 for endorsing the e-check and sending the endorsed e-check 102 to the merchant's bank's server 8. The merchant's bank's server 8 then assures an Automated Clearing House (ACH) or Electronic Check Presentment (ECP) debit 10 of the customer's account with the customer's bank to the customer's bank's server 12 over the ACH or ECP system.

Figure 2:
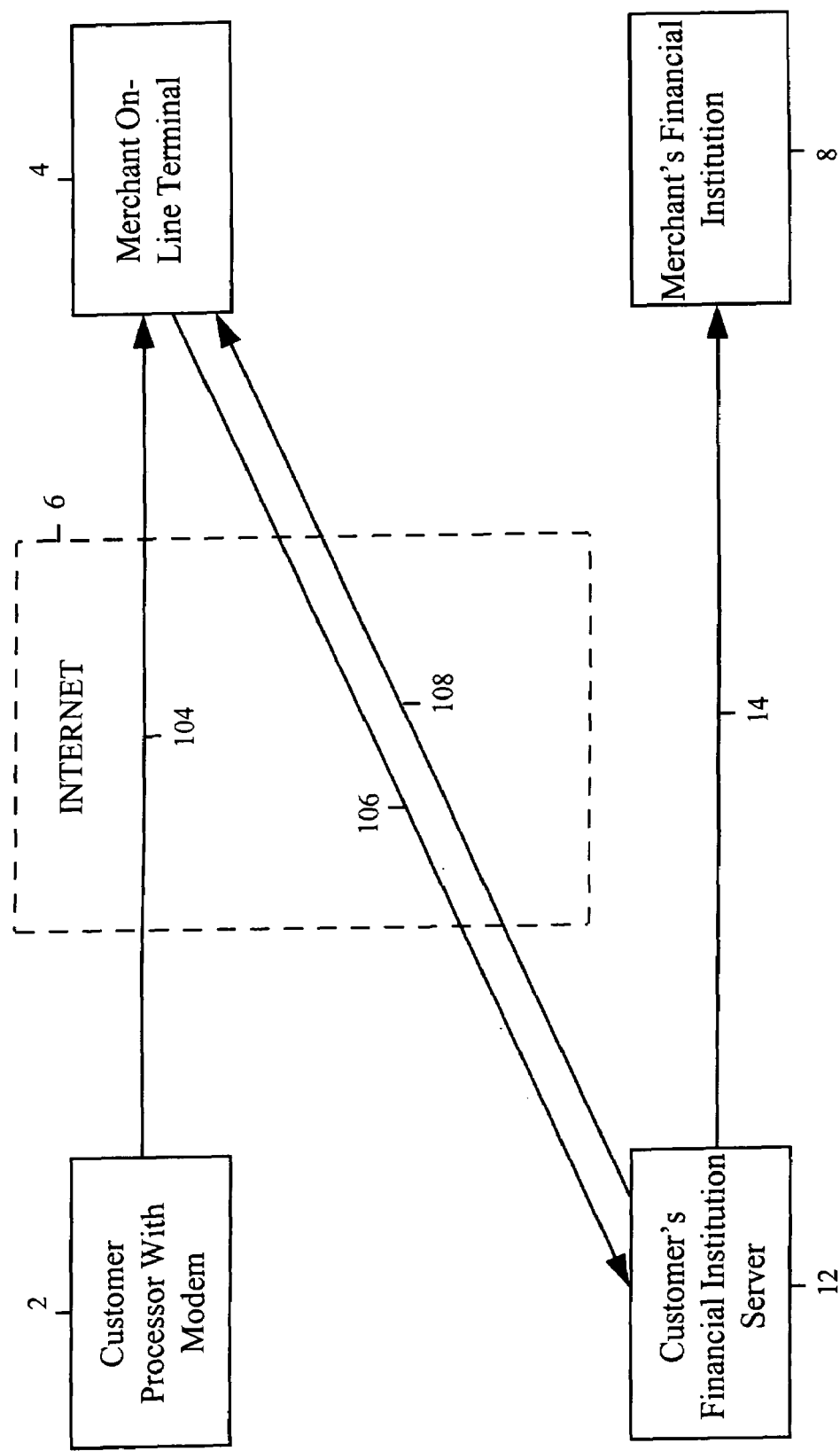
FIG. 2 is a schematic diagram which illustrates an example overview of key components and the flow of information between the key components for a prior art Z-flow direct presentment model for an Internet transaction.

FIG. 2 is a schematic diagram which illustrates an example of key components and the flow of information between the key components for a prior art Z-flow direct presentment model for an Internet transaction. Aspects of the Z-flow model include, for example, use of customer software on the customer's PC or processor 2 by the customer, use of merchant software by the merchant at the merchant's on-line terminal 4, use of paying bank software by the customer's bank on the customer's financial institution server 12, and the ACH system for assuring an ACH credit 14 to the merchant's bank 8 for the merchant's account with the merchant's bank. Another aspect of the Z-flow model can be the use of digital certificates or other suitable encryption or security device to authenticate the identity of the customer, for example, for the customer and the merchant.

The Z-flow model makes use of computer hardware and software for exchanging payment instruction information securely over the Internet 6 and enabling payments, for example, by the customer to a small merchant or to another customer or by a business to another business. The Z-flow model utilizes a payment instrument which uses money in a checking or savings account to conduct financial transactions over the Internet 6. The Z-flow model is sufficiently different from the current concept of the e-check that any reference to a "check" is misleading. Thus, terminology, such as "payment instruction" is used for the payment instrument of the Z-flow model.

The Z-flow model utilizes software to provide security, or alternatively, the software security can be replaced with a hardware device. The Z-flow model offers a payment vehicle for purchases and exchanges of value over the Internet 6. Not only can the payment vehicle for the Z-flow model cause payments to be made, but it can also include instructions or payment order information. All of this is done securely using digital signatures and certificates or other methods of encryption or other security methods to authenticate the identity of the customer with financial settlement occurring over the traditional Automated Clearing House (ACH) network.

Referring to FIG. 2, the Z-flow model uses a direct presentment process. For example, the customer at the customer's processor 2, such as the customer's PC, makes a purchase from an Internet merchant and sends the customer's payment order via e-mail or Hypertext Markup Language (HTML) page 104 to the merchant at the merchant's on-line terminal 4 over the Internet 6. The merchant's on-line terminal 4 directly presents the payment order 106 to the customer's bank's server 12. The customer's bank's server 12 performs an on-line authentication that the payment instruction came from the customer, that sufficient funds are available, and that there are no reasons not to pay the payment order. Once this is done, the customer's bank's server 12 holds or debits the customer's account for the amount of the transaction and immediately sends an e-mail 108 to the merchant's on-line terminal 4 confirming that the customer's bank's server 12 will send out an ACH credit 14 to satisfy the payment order. Simultaneously, the customer's bank's server 12 prepares and sends out the ACH credit 14 to the merchant's bank's server 8.

Referring further to the Z-flow model shown in FIG. 2, assume that the customer makes a purchase from an Internet merchant, such as Barnes & Noble. The customer at the customer's processor 2 accesses the Barnes & Noble home page and selects a book that the customer 2 would like to buy. After the customer selects the book, Barnes & Noble calculates the cost plus shipping and presents the customer with the option to pay by credit card or with funds in the customer's checking or savings account. If the customer selects checking or savings account, the customer's selection activates the customer's payment software, which the customer has previously loaded onto the customer's processor 2. The customer's software, which will accept the payment information from either a web page or an e-mail, displays a payment order form with the payee's name, such as Barnes and Noble, and the date and the amount of the purchase filled in, and then asks the customer if he or she would like to send a payment to Barnes and Noble.

Referring again to the Z-flow model shown in FIG. 2, if the customer enters "Yes," the customer's software on the customer's processor 2 composes an e-mail or Web response consisting of purchase order information, a payment instruction, an assigned and consecutively issued serial number, the customer's e-mail address, the customer's digital signature or other suitable encryption device which prevents the information from being changed, and the customer's digital certificate. The customer's digital certificate is issued by a financial institution, such as the customer's bank. The digital certificate is a digital document which, through the use of public key encryption technology, assures the merchant that the customer is who he or she says he or she is and provides the name of the customer's bank and the customer's account number. The customer's account number is encrypted, so that it cannot be seen by the merchant. The customer's message may be encrypted in such a manner so as to allow the merchant to see the purchase order information and the name of the customer's bank and/or the bank's ABA routing/transit number. The customer's software on the customer's processor 2 sends this e-mail or HTML page 104 to the merchant at the merchant's on-line terminal 4 over the Internet 6.

Referring still further to the Z-flow model shown in FIG. 2, after receiving the customer's e-mail or Web response, the merchant at the merchant's on-line terminal 4 assigns a reference number to the order. Using the merchant's software at the merchant's on-line terminal 4, the merchant digitally signs or uses another method to secure a document consisting of the customer's e-mail or HTML page plus the reference number. The merchant's software at the merchant's on-line terminal 4 then composes another e-mail message or HTML page consisting of the customer's e-mail or HTML page response, the reference number, the merchant's request for payment, the merchant's digital signature and the merchant's digital certificate or other security methodology. The merchant's digital certificate is the customer's assurance that the merchant is who it says it is. The certificate also includes the name of the merchant's bank and the merchant's encrypted account number, as well as other certificates stating which bank issued the certificate. The resulting message is encrypted. The merchant's software at the merchant's on-line terminal 4 then sends the encrypted e-mail or HTML page 106 directly to the customer's bank's server 12 over the Internet 6. The merchant's software at the merchant's on-line terminal 4 knows to which bank to send it, because the name of the customer's bank was included in the customer's digital certificate.

Referring once again to the Z-flow model shown FIG. 2, upon receipt of the e-mail or HTML page 106 by the customer's bank's server 12, the customer's bank's server 12 verifies the validity of the merchant's digital certificate, verifies the validity of the customer's digital certificate or other security methodology, and performs various security checks, such as ensuring that payment has not been stopped and that the payment instruction is not a duplicate of a previously paid payment instruction. The customer's bank's server 12 also performs an on-line verification that sufficient funds are available. If funds are available, the funds are held on line, a debit is prepared for the purchase, and an e-mail or HTML page 108 is prepared and sent by the customer's bank's server 12 over the Internet 6 to the merchant at the merchant's on-line terminal 4 telling the merchant that the transaction has been approved and that the merchant will receive an ACH credit 14 for the amount of the purchase, for example, within one business day.

Referring still further to the Z-flow model shown in FIG. 2, if funds are available, the customer's bank's server 12 decrypts the merchant's digital certificate, and from that, the customer's bank's software on the customer's bank's server 12 prepares the ACH formatted credit 14 which is sent to the merchant's bank 8. Alternatively, if funds are not available, an e-mail or HTML page to the merchant's on-line terminal 4 is prepared by the customer's financial institution 12 telling the merchant that the transaction has not been approved, and the customer's bank's server 12 also sends an encrypted e-mail or HTML page denying the transaction back to the merchant at the merchant's on-line terminal 4. Upon receipt of the transaction approval 108 at the merchant's on-line terminal 4, the merchant, knowing that the funds for the goods will be forthcoming, can send out the goods immediately. This eliminates many days delay, when compared to payment with a traditional paper check.

Referring once again to the Z-flow model shown in FIG. 2, included in the ACH credit 14 which the customer's bank's server 12 prepares and sends to the merchant's bank 12 for the merchant's account at the merchant's bank is the information needed to be in compliance, for example, with Federal Reserve Board Regulation E or the National Automated Clearing House Association (NACHA) rules and to allow the merchant to reconcile each payment with those the merchant was accepting. The ACH credit 14 stipulates when the funds are available in the merchant's financial institution, for example, either the same business day, the next, or the next. The merchant's bank 8 receives the ACH credit 14 and posts it to the merchant's account in accordance with the included instructions from the customer's bank's server 12. The merchant's bank's server 8 makes the details of the payment, such as the purchaser's name, reference number, date, and amount, available to the merchant at the merchant's on-line terminal 4 on a periodic account statement or through its on-line services.

Another aspect of the Z-flow model direct presentment process shown in FIG. 2 is payment by the customer to a small business, such as a small merchant over the Internet 6, in which the flow of information is analogous to the payment by the customer to the Internet merchant illustrated in FIG. 2. In this aspect, the small business stands in the position of the Internet merchant, and the small business's bank stands in the position of the Internet merchant's bank. The customer uses the customer's existing software facility at the customer's processor 2 for receiving e-mail including, for example, e-mail bills. The customer receives an e-mail bill from the small business and wants to pay the bill. The customer activates the customer's software at the customer's processor 2, and the customer's software composes a payment instruction consisting, for example, of the billing information, the payment instruction, the customer's e-mail address, and the customer's digital signature and certificate.

In the payment by the customer to the small business aspect of the Z-flow model shown in FIG. 2, if the customer wants the payment instruction to be private, the customer encrypts the message at the customer's processor 2 using the payee's public encryption key, which was downloaded as part of a web transaction or previously obtained from an e-mail transaction. The message is encrypted in such a way as to allow the small business to see only the information which is needed to record the payment accurately. If the customer is simply making a payment, the customer manually fills in the information. However, for the customer who received the bill from the small business by e-mail, the customer's software at the customer's processor 2 pre-fills most of the information, for example, following industry bill presentment standards. The customer's software at the customer's processor 2 sends this e-mail to the small business's on-line terminal at its address on the bill over the Internet 6. After receiving the customer's payment instruction from the e-mail, the business either assigns a reference number to the payment or uses a number from the original bill. The business at its on-line terminal composes a message which contains the original payment instruction, the reference number and a request for payment. The business' software at its on-line terminal then digitally signs the combined document and attaches its digital certificate, and the document is encrypted. The business's software at its processor sends the document to the customer's bank's server 12. The business obtains the address for the customer's bank's server 12 from the customer's certificate or from an internal file.

In the payment by the customer to the small business aspect of the Z-flow model, upon receipt of the e-mail or HTML page by the customer's bank's server 12, the customer's bank's server 12 verifies the validity of the digital certificate or other security methodology used of the business, verifies the validity of the digital certificate of the customer, performs various security checks such as ensuring that payment has not been stopped and that the payment instruction is not a duplicate of a previously paid instruction, and performs an on-line verification that sufficient funds are available. If funds are available, the funds are held on line, a debit is prepared for the purchase, and an e-mail or HTML page to the business is prepared by the customer's bank's server 12 telling it that the transaction has been approved and that it will receive an ACH credit 14 for the amount of the purchase, for example, within one business day. If funds are available, the customer's bank's server 12 decrypts the digital certificate of the business and from that the customer's bank's software prepares the ACH credit 14 to be sent to the business's bank's server. If funds are not available, an e-mail or HTML page to the business is prepared telling it that the transaction has not been approved. The customer's bank's server 12 sends 108 the encrypted e-mail or HTML page approving or denying approval of the transaction back to the business's on-line terminal. Upon receipt of the e-mail or HTML page by the business, knowing that the funds for the goods will be forthcoming, the business can send out the goods immediately. This eliminates many days' delay when compared to payment with a traditional paper check.

In this aspect of the Z-flow model shown in FIG. 2, included in the ACH credit 14 which the customer's bank's server 12 prepares and sends to the business's bank's server for the business's account at the business's bank, is the information needed to be in compliance, for example, with Federal Reserve Board Regulation E or NACHA rules and to allow the business to reconcile each payment with those it accepts. The ACH credit 14 stipulates that the funds are available in the business's account, for example, either the same business day, the next, or the next. The business's bank receives the ACH credit 14 and posts it to the business's account in accordance with the instructions which were included by the customer's bank's server 12. The business's bank makes the details of the payment, such as the name of the customer, reference number, and date and amount, available to the business on a periodic account statement or through its on-line services.

Another aspect of the Z-flow direct presentment model shown in FIG. 2 is payment by the customer to a second customer-payee, in which the flow of information is likewise analogous to the flow of information in the process of payment by the customer to the Internet merchant illustrated in FIG. 2. In this aspect, the second customer-payee stands essentially in the same position as the Internet merchant, and the second customer-payee's bank stands essentially in the same position as the Internet merchant's bank. In such aspect, the second customer-payee, is provided with software to function both as a customer-originator and as a payee. The first customer initiates sending a payment instruction without previously receiving an e-mail or HTML page. For example, in this aspect, the first customer wants to send a gift or wants to send money to the second customer who is a child in college. The first customer at the customer's processor 2 creates an e-mail and attaches the payment instruction to the e-mail. The first customer must know the second customer's e-mail address and certificate name in order to send the payment instruction. The first customer at the customer's processor 2 digitally signs the payment instruction and attaches his or her digital certificate. If the first customer wants the payment instruction to be private, he or she must encrypt the message at the customer's processor 2 using the public encryption key for the second customer, which the first customer previously obtained. The remainder of the process is the same as in the process of the payment by the customer to the small business.

An additional payment aspect of the Z-flow direct presentment model shown in FIG. 2 is a payment by a small business to another small business. Again, the flow of information is analogous to the payment by the customer to the Internet merchant illustrated in FIG. 2. In this aspect, the small business-payer stands essentially in the position of the customer, the small business-payer's bank stands essentially in the position of the customer's bank, the small business-payee stands essentially in the position of the Internet merchant, and the business-payee's bank stands essentially in the position of the Internet merchant's bank. This aspect involves combining elements of the process of payment by the customer to the small business and the process of payment by the customer to a second customer-payee.

In this aspect of the Z-flow model shown in FIG. 2, the business-payer may or may not initiate a payment instruction on the business-payer's processor as a result of an invoice sent via e-mail or HTML page. The small business-payer uses its originator software to create an e-mail, which includes information about the purpose of the payment, and attaches the payment instruction to the e-mail. The business-payer obtains the e-mail address for the business payee from a previous e-mail received from the second business, or direct from the business-payee, in order to send the payment instruction. The business-payer uses its business-payer software to digitally sign the payment instruction and attaches its digital certificate. If the business-payer wants the payment instruction to be private, it must encrypt the message using the public encryption key of the business-payee, which the business-payer previously obtained. The remainder of the process is the same as the process of the payment by the customer to a small business.

Figure 3:
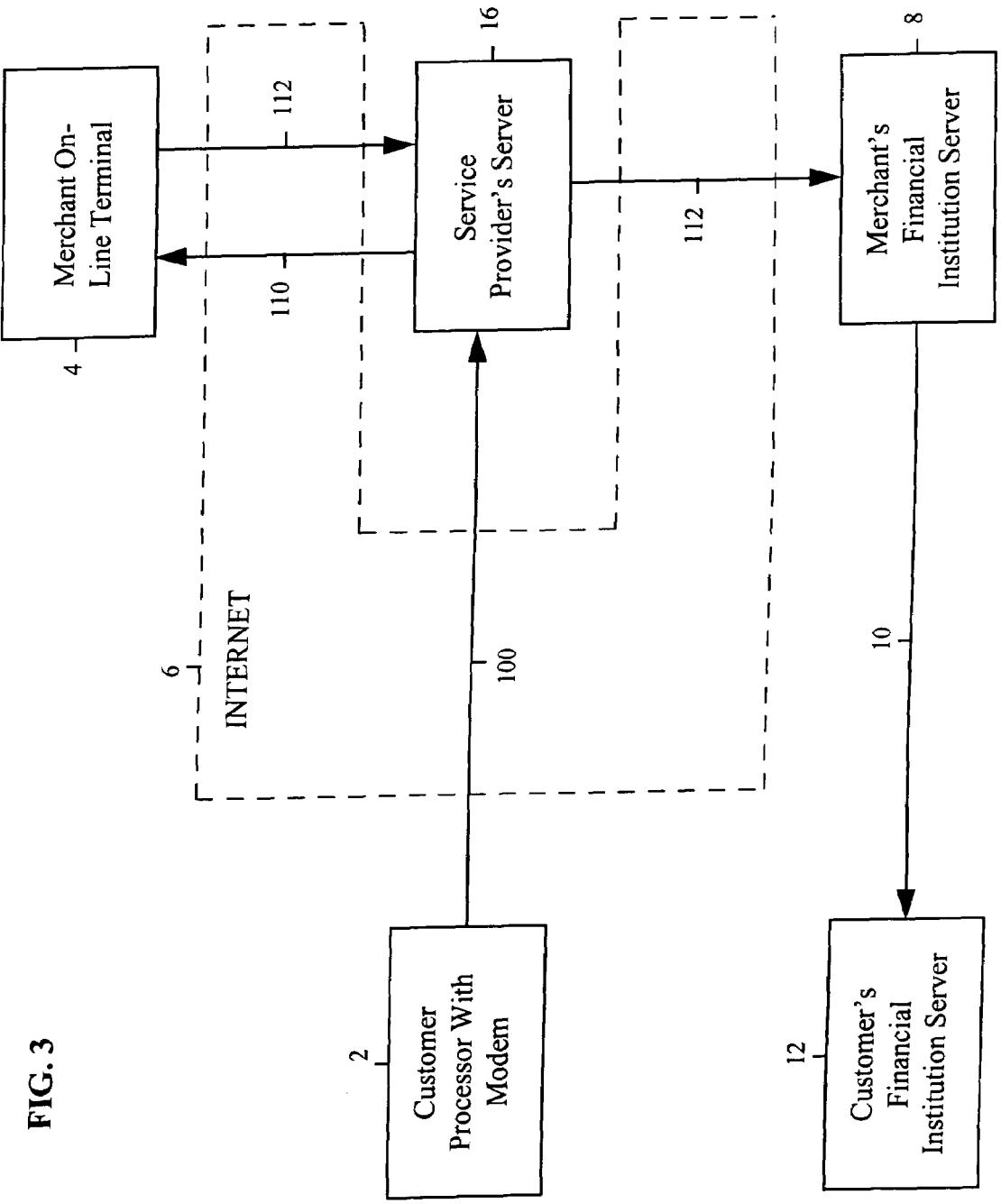
FIG. 3 is a schematic diagram which illustrates an example overview of key components and the flow of information between the key components for the assumption of merchant functions by a service provider in the e-check process for an embodiment of the present invention.

Referring now in detail to an embodiment of the present invention, an example of which is illustrated in the accompanying drawings, the system and method for an embodiment of the present invention provides, for example, for the assumption by a service provider of certain merchant functions in the e-check model. FIG. 3 is a schematic diagram which illustrates an example overview of key components and the flow of information between the key components for the assumption of merchant functions by a service provider in the e-check aspect for an embodiment of the present invention. Referring to FIG. 3, the service provider using a service provider server 16 is a representative for the merchant but is otherwise invisible to the other participants in a transaction. In an embodiment of the present invention, the service provider's server 16 sits between the customer's processor 2 and the merchant's on-line terminal 4 and may run the merchant's website for the merchant. The customer thinks he or she is dealing with the merchant at the merchant's website, but the customer is actually dealing with the service provider's server 16 for the merchant. Thus, the merchant is able to use its existing systems without modification or new functionality to receive transactions via the service provider's server 16.

Figure 4:
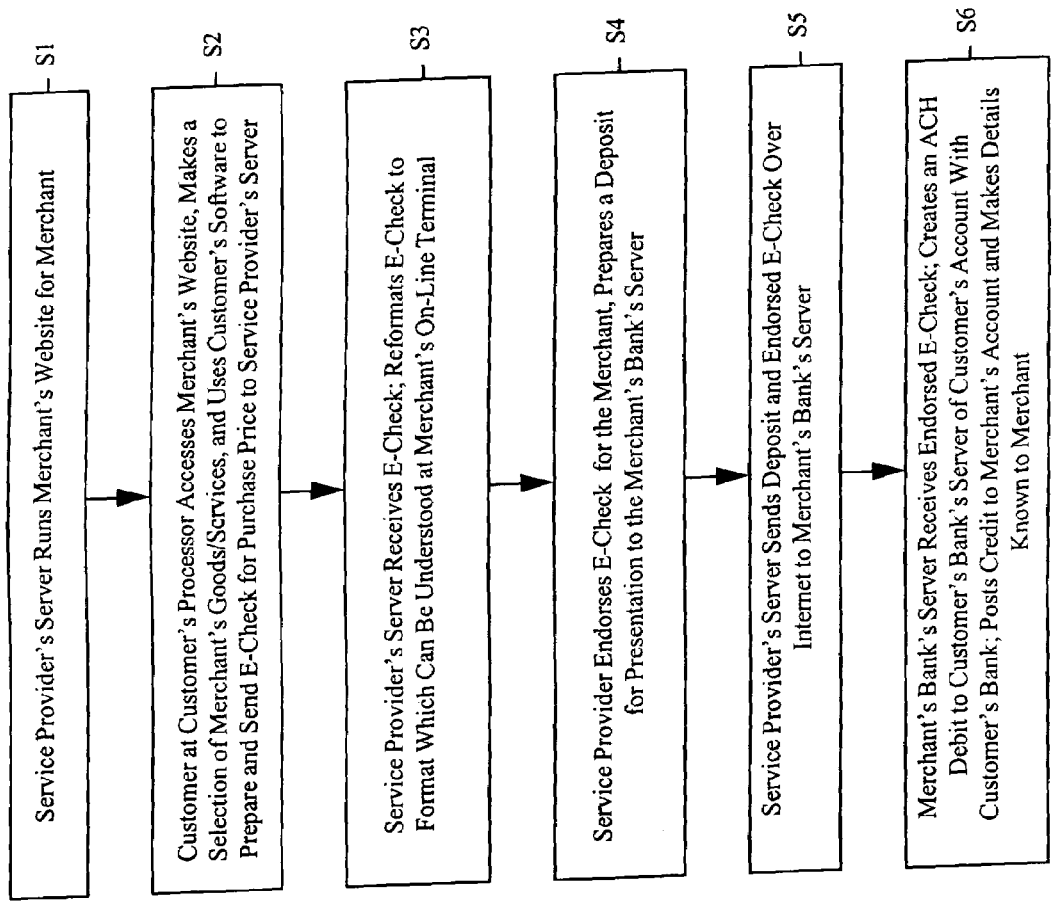
FIG. 4 is a flow chart which amplifies the flow of information shown in FIG. 3 and provides further detail regarding an example of the assumption of merchant functions by the service provider in the e-check process for an embodiment of the present invention.

FIG. 4 is a flow chart which amplifies the flow of information shown in FIG. 3 and provides further detail regarding an example of assumption of merchant functions by the service provider in the e-check model for an embodiment of the present invention. Referring to FIG. 4, at S1, the service provider's server 16 runs the merchant's website for the merchant. At S2, the customer at the customer's processor 2 accesses the merchant's website, makes a selection of the merchant's goods or services, and uses the customer's software to prepare and send an e-check 100 for the purchase. As mentioned, the customer thinks he or she is dealing with the merchant, but the customer is actually dealing with the service provider's server 16, so the e-check 100 is actually sent to the service provider's server 16 for the merchant. At S3, the service provider's server 16 receives the e-check and reformats the e-check to a format so that the payment information can be read at the merchant's on-line terminal 4 and sends the reformatted e-check 110 to the merchant's on-line terminal 4 over the Internet 6 or other mutually agreed to communications vehicle. At S4, the service provider's server 16 endorses the e-check and prepares a deposit to the merchant's account. At S5, the service provider's server 16 sends the endorsed e-check 112 over the Internet 6 to the merchant's bank's server 8. At S6, the merchant's bank's server 8 receives the endorsed e-check 112 and then creates an ACH or ECP debit 10 to the customer's account with the customer's bank. The merchant's bank's server 12 posts a credit to the merchant's account and makes the details of the payment available to the merchant on a statement and through its on-line services.

Figure 5:
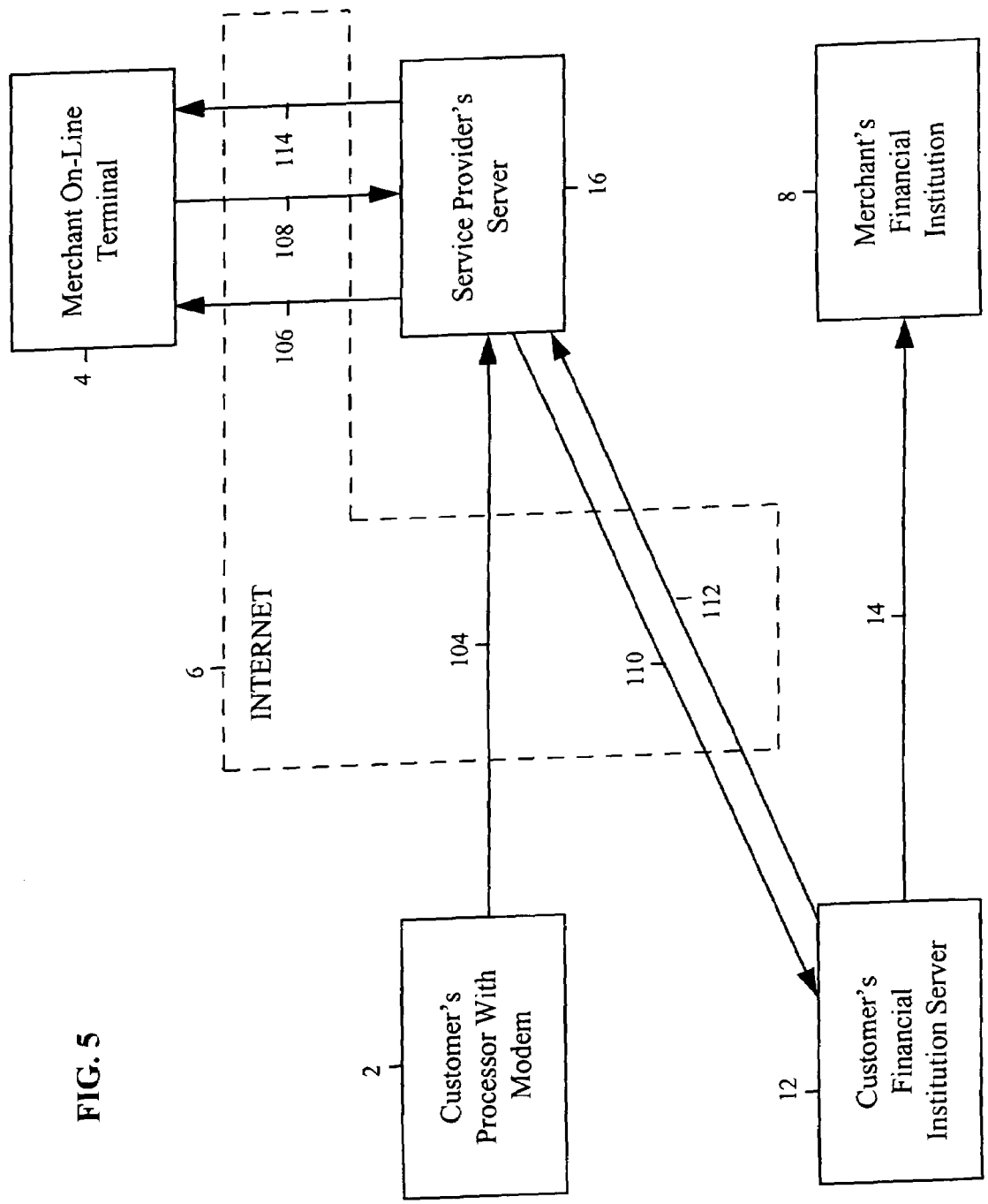
FIG. 5 is a schematic diagram which illustrates an example overview of key components and the flow of information between the key components for the assumption of merchant functions by a service provider in the Z-flow process for an embodiment of the present invention.

The system and method for an embodiment of the present invention also provides, for example, for the assumption of certain merchant functions in the Z-flow model. FIG. 5 is a schematic diagram which illustrates an example overview of key components and the flow of information between the key components for the assumption of merchant functions by the service provider in the Z-flow model for an embodiment of the present invention. Referring to FIG. 5, the service provider is likewise a representative for the merchant but is otherwise invisible to the other participants in a transaction. In an embodiment of the present invention, the service provider's server 16 also sits between the customer's processor 2 and the merchant's on-line terminal 4 and may run the merchant's website for the merchant. It appears to the customer that he or she is dealing with the merchant at the merchant's website, but the customer is actually dealing with the service provider's server 16 for the merchant. Thus, the merchant is able to use its existing systems without modification or new functionality to receive transactions via the service provider's server 16.

Figure 6:
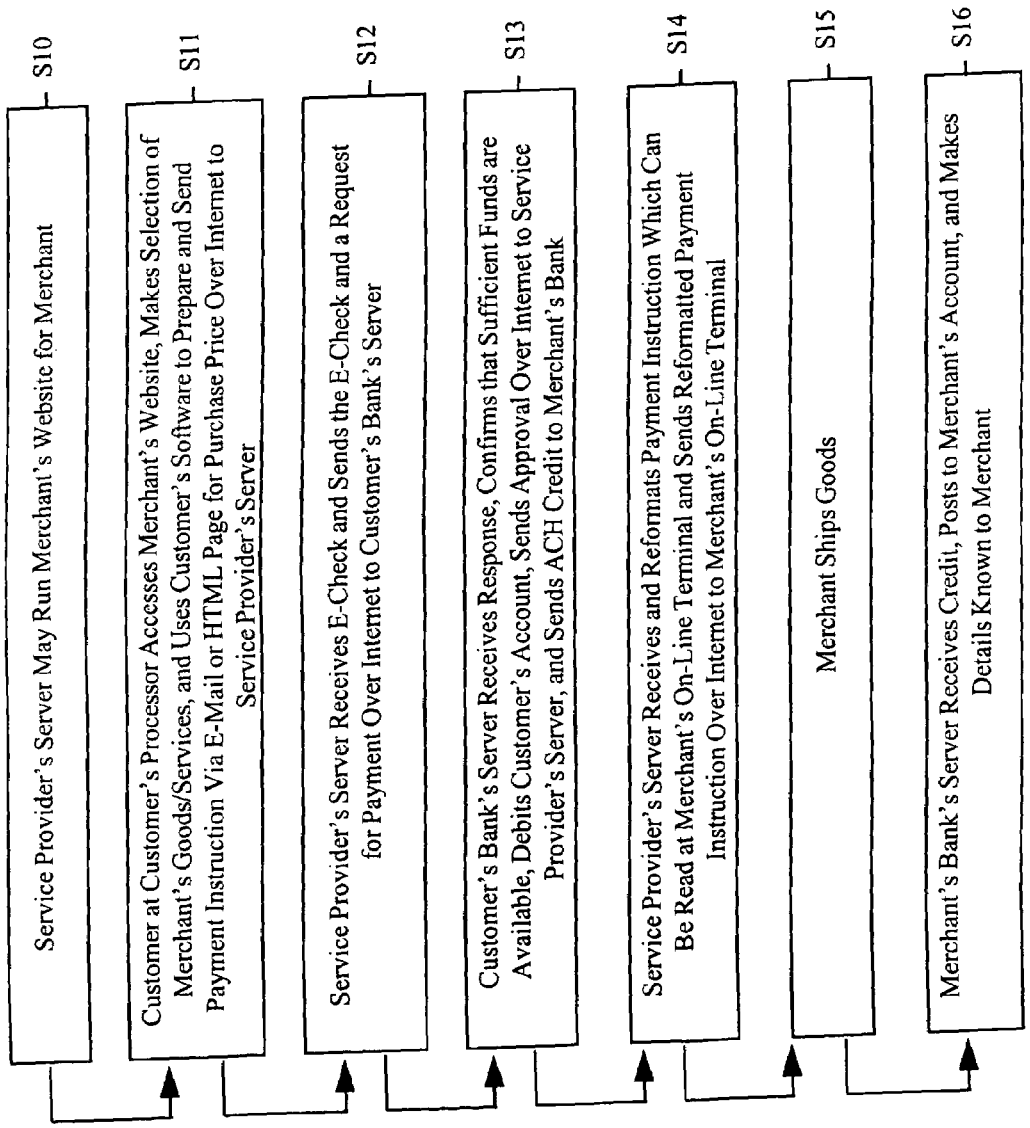
FIG. 6 is a flow chart which amplifies the flow of information shown in FIG. 5 and provides further detail regarding an example of the assumption of merchant functions by a service provider in the Z-flow process for an embodiment of the present invention.

FIG. 6 is a flow chart which amplifies the flow of information shown in FIG. 5 and provides further detail regarding an example of the assumption of merchant functions by the service provider in the Z-flow model for an embodiment of the present invention. Referring to FIG. 6, at S10, the service provider's server 16 runs the merchant's website for the merchant. At S11, the customer at the customer's processor 2 accesses the merchant's website, makes a selection of the merchant's goods or services, and uses the customer's software to prepare and send a payment instruction for the purchase prices via e-mail or HTML page 104 over the Internet 6 to the service provider's server 16. At S12, the service provider's server 16 receives the payment instruction and sends the payment instruction with a request for payment 110 to the customer's bank's server 12. At S13, the customer's bank's server 12 receives the request for payment 110, confirms that sufficient funds are available and that there is no reason not to pay the payment instruction.

Referring further to FIG. 6, once this is done, the customer's bank's server 12 holds or debits the customer's account for the amount of the transaction and immediately sends an approval 112 over the Internet 6 to the service provider's server 16 confirming that the customer's bank's server 12 will send out an ACH credit to satisfy the payment instruction. At the same time, the customer's bank's server 12 prepares and sends out the ACH credit 14 to the merchant's bank's server 8. At S14, the service provider's server 16 receives the approval 112 and reformats and sends the reformatted approval 114 to the merchant's on-line terminal 4. At S15, the merchant receives the approval 112 at the merchant's on-line terminal 4 and ships the goods. At S16, the merchant's bank receives the credit, posts the credit to the merchant's account, and makes the details known to the merchant.

Figure 7:
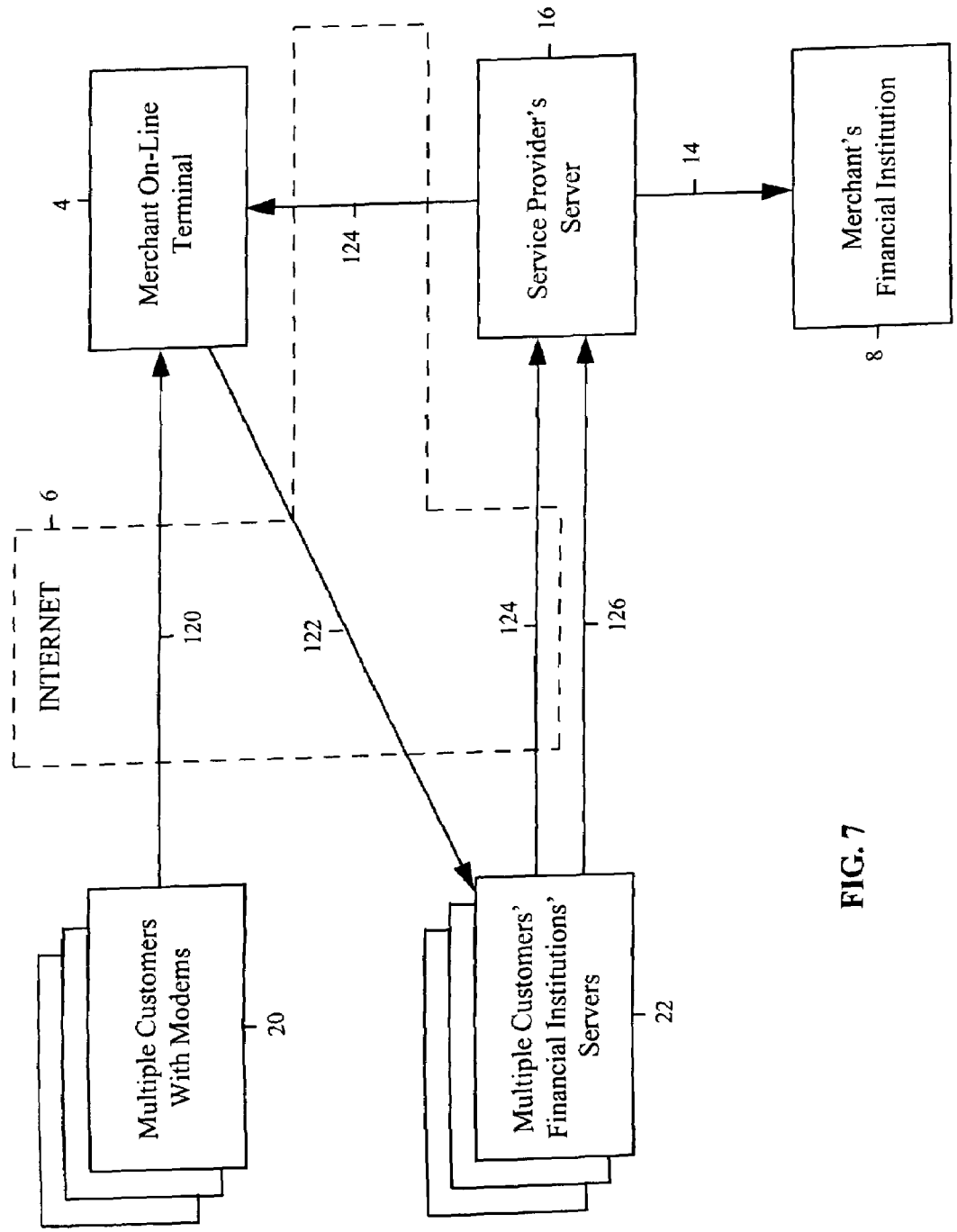
FIG. 7 is a schematic diagram which illustrates an example overview of the key components and the flow of information between the key components for a consolidation of credits aspect of the assumption of merchant functions by the service provider in the Z-flow process for an embodiment of the present invention.

FIG. 7 is a schematic diagram which illustrates an example overview of key components and the flow of information between the key components for a consolidation of credits aspect of the assumption of merchant functions by the service provider in the Z-flow process for an embodiment of the present invention. In the traditional Z-flow process, each transaction with a customer incurs a separate transaction charge for the merchant, for example, by the merchant's bank, as each transaction is treated separately. Referring to FIG. 7, in an embodiment of the present invention, the service provider's server 16 sits between the merchant's on-line terminal 4 and the merchant's bank's server 8. Typically, the merchant's on-line terminal 8 is receiving many transactions 120 separately from a plurality of customers' processors 20. In this aspect of an embodiment of the present invention, the service provider's server 16 consolidates settlement transactions, and rather than receiving individual credits, the service provider's server 16 assures that the merchant's bank's server 8 receives one consolidated ACH credit 14 for the merchant covering all payment instructions 120 over a period of time. Thus, the merchant incurs only a single transaction charge for the plurality of transactions 120 rather than separate transaction charges for each individual transaction.

Figure 8:
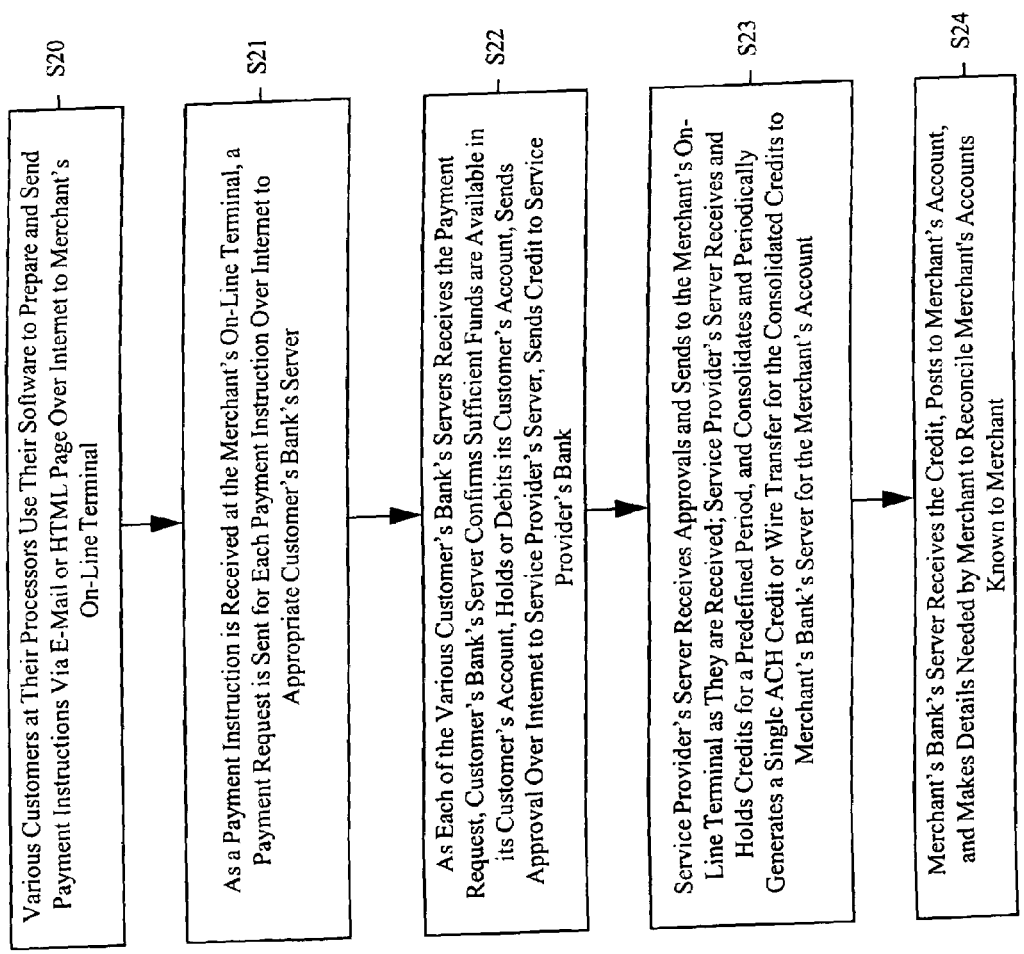
FIG. 8 is a flow chart which amplifies the flow of information shown in FIG. 7 and provides further detail regarding an example of the consolidation of credits aspect of the assumption of merchant functions by the service provider in the Z-flow process for an embodiment of the present invention.

FIG. 8 is a flow chart which amplifies the flow of information shown in FIG. 7 and provides further detail regarding an example of the consolidation of credits aspect of the assumption of merchant functions by the service provider in the Z-flow process for an embodiment of the present invention. Referring to FIG. 8, at S20, from time to time, various customers use the software on their processors 20 to prepare and send payment instructions (the payment instructions from various customers are shown collectively as 120 in FIG. 8) via e-mail or HTML page over the Internet 6 to the merchant's on-line terminal 4. At S21, as a payment instruction is received from customers at the merchant's on-line terminal 4 from time to time, a payment request is automatically sent for each payment instruction from the merchant's on-line terminal 4 (the payment requests for the various payment instructions are shown collectively as 122 in FIG. 8) over the Internet 6 to the appropriate customer's bank's server (the various customer's bank's servers are shown collectively as 22 in FIG. 8).

Referring further to FIG. 8, at S22, as each of the various customer's bank's servers 22 receives a payment request from the merchant's on-line terminal 4, the customer's bank's server confirms sufficient funds are available in its customer's account and that there is no reason not to pay the payment instruction for its customer, holds or debits its customer's account for the amount of its customer's transaction, and immediately sends its approval (the approvals for various payment instructions are shown collectively as 124 in FIG. 8) to the service provider's server 16. At the same time, the customer's bank sends a credit, for example, by wire transfer for its customer's transaction to the service provider's server 16. The credits received from various customers' banks 22, from time to time, credits are shown collectively as 126 in FIG. 8.

Referring again to FIG. 8, at S23, the service provider's server 16 receives the various approvals 124 and sends them to the merchant's on-line terminal 4 as they are received. However, the service provider's bank receives and holds the various credits 126 over a period of time and consolidates the credits 126 and periodically generates a single ACH credit 14 or wire transfer for the consolidated credits to the merchant's bank's server 8 for the merchant's account. At S24, the merchant's bank's server receives the consolidated credit, posts the credit to the merchant's account, and makes the details needed by the merchant to reconcile the merchant's account known to the merchant.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method for assumption by a service provider of at least one merchant function in a financial transaction between a customer and a merchant, comprising:

receiving information about the financial transaction consisting at least in part of an electronic payment order for the merchant by a service provider's server from the customer at a customer's computing device via a network;

identifying an intended recipient of the information by the service provider's server for the merchant consisting of one of a merchant's bank and a customer's bank;

if the merchant's bank is the intended recipient, reformatting the electronic payment order for a merchant's on-line terminal by the service provider's server, sending the reformatted payment order to the merchant's on-line terminal by the service provider's server, endorsing the electronic payment order by the service provider's server, preparing a deposit to an account of the merchant by the service provider's server, sending the deposit with the endorsed payment order to a merchant's bank's server by the service provider's server, posting a credit for the deposit to the merchant's account by the merchant's bank's server, and making details of the deposit available to the merchant by the merchant's bank's server; and if the customer's bank is the intended recipient, sending the electronic payment order with a request for payment to a customer's bank's server by the service provider's server, debiting an account of the customer for the amount of the payment order by the customer's bank's server, sending an ACH credit to the merchant's bank's server by the customer's bank's server, sending a transaction approval to the service provider's server by the customer's bank's server, reformatting the transaction approval for the merchant's on-line terminal by the service provider's server, and sending the reformatted approval to the merchant's on-line terminal.

2. The method of claim 1, wherein receiving the information about the financial transaction further comprises receiving a payment instruction for the merchant.

3. The method of claim 2, wherein receiving the payment instruction further comprises receiving the payment instruction by the service provider server.

4. The method of claim 3, wherein receiving the payment instruction by the service provider server further comprises receiving the payment instruction from a customer's processor over the Internet.

5. The method of claim 4, wherein receiving the payment instruction from the customer's processor over the Internet further comprises receiving the payment instruction representing a payment by the customer in an Internet website transaction with the merchant.

6. The method of claim 5, wherein receiving the payment instruction representing payment by the customer in the Internet website transaction with the merchant further comprises receiving the payment instruction representing payment by the customer in the Internet transaction with the merchant at an Internet website hosted by the service provider server for the merchant.

7. The method of claim 1, wherein receiving the information about the financial transaction further comprises receiving an approval of a payment instruction for the merchant.

8. The method of claim 7, wherein receiving the approval further comprises receiving the approval by the service provider server.

9. The method of claim 8, wherein receiving the approval further comprises receiving the approval from the customer's bank's server over the Internet.

10. The method of claim 9, wherein receiving the approval from the customer's bank's server further comprises receiving a credit by the service provider server from the customer's bank's server over the Internet.

11. The method of claim 10, wherein receiving the credit by the service provider server further comprises consolidating the credit with at least one additional credit for the merchant.

* * * * *